2,913,348

ORGANIC COATING COMPOSITION CONTAINING BASIC NICKEL CARBONATE

Julius Jackson, Westfield, N.J., assignor to E. I. du Pont de Nemours and Company, Wilmington, Del., a corporation of Delaware No Drawing. Application August 21, 1958
Serial No. 756,297

14 Claims. (Cl. 106—193)

This invention relates to improved pigments and improved coating compositions containing basic nickel carbonate.

One of the chief characteristics of a good coating composition is durability. In such compositions, the applied material is free from any tendency to blister, crack, check, or the like, over a prolonged period; thus providing an unbroken and adhering covering surface on the coated material. While coating compositions which possess these latter properties may be characterized as durable, durability must be further considered from the standpoint of color retention when the composition is intended to be used as a decorative coating. The present invention is concerned with both of these aspects of durability. It has been found that basic nickel carbonate may be used to extend the outdoor life of coating compositions. It has also been found that this material imparts light stability to certain colored pigments which have a tendency to change upon exposure to light.

Incorporating pigments into organic coating compositions to extend the outdoor life of the coatings is not new. In the past, "durable" pigments such as carbon black, titanium dioxide, basic lead carbonate, zinc oxide, iron blues, chrome yellows and the like have all been used as pigments in interocellulose lacquer and in oil-modified alkyd resin and oleoresinous varnish formulations to enhance the resistance of the films to blistering, cracking, checking, and the like on exposure to the weather and sunlight. Most of these so-called "durable" pigments are characteristically colored, which may often be desirable. On the other hand, a characteristic color restricts the use of the pigment to coatings of the same or very similar colors. Moreover, nearly all such pigments are also opaque in nature, and although this is desirable in terms of hiding power, it is undesirable for coatings in which transparency or some translucence is desired. Furthermore, in many cases only a small amount of the durable pigment is necessary to impart the proper color, while a relatively large amount is required to provide optimum improvement in the durability of the coating film. Thus, a major portion of the coloring power of the pigment may be wasted in order to achieve optimum durability.

There are other pigments which may be desirable for their color or low cost, but such materials do not prolong film life. These are classed as "non-durable" pigments and include some of the organic maroons and many of the extender-type pigments, such as barium sulfate and calcium carbonate. For durable exterior finishes containing "non-durable" pigments, "durable" pigments may be added to the coating compositions. However, such mixtures of pigments may pose other serious problems. Thus, adjusting formulations to the desired color and simultaneously achieving satisfactory durability may be an extremely difficult and time-consuming task.

To simplify the use of the less durable pigments for exterior finishes and to permit the use of only the amounts of the "durable" pigments necessary for color, a pigment to extend the outdoor life of the coatings without imparting appreciable color or opacity is needed. Such a pigment would permit maximum flexibility in formulating coating compositions. The desired color could be obtained from small amounts of the known colored "durable" or "non-durable" pigments, and the substantially colorless pigment would provide durability. In other cases, the pigments used in the coating composition may be durable in the sense that the protective value of the film remains unharmed, yet a change in the color of the pigment occurs on exposure to sunlight. In such cases, there is a need for a colorless pigment which can be incorporated with the colored pigment to improve the light stability of the latter.

It is an object of this invention to improve the durability of coating compositions by providing means for extending the protective life of the composition. It is another object of this invention to improve the durability of coating compositions by providing means for improving the lightfastness of certain colored pigments used in coating compositions. It is a further object to improve durability without causing a substantial change in the color or opacity of the films formed from said compositions.

The objects of this invention are accomplished by a coating composition comprising an organic film-forming material and basic nickel carbonate in a minor amount sufficient to impart durability to the composition.

In one preferred embodiment of this invention, basic nickel carbonate is prepared by adding a solution of an alkaline carbonate such as sodium carbonate to a solution of a nickel salt such as nickel chloride, nickel sulfate, nickel nitrate or nickel acetate, in equimolecular proportions to give a precipitate in which the ratio of nickel to carbon dioxide is about 1.5 to 1.7. This precipitate is filtered and washed substantially free of soluble salts. It is then dried and pulverized in any conventional manner to give a light green powder. This powder is then dispersed, either alone or in combination with other pigments, in any conventional coating composition vehicle by any of the well-known dispersing or grinding techniques commonly practiced in the manufacture of pigmented coating compositions. The amount of basic nickel carbonate in the coating composition should be between 0.3 and 50 parts per 100 parts of the film-forming material (vehicles solids), the total pigmentation being preferably between about 15 and about 35 parts per 100 parts of film-forming materials. The preferred film-forming materials for use in my invention include alkyd resins, oleoresinous varnishes and cellulose esters such as as cellulose nitrate.

In another preferred embodiment of this invention a solution of a nickel salt such as nickel chloride, nickel sulfate, and the like is added to an aqueous slurry of a colored pigment and the basic nickel carbonate is precipitated in the presence of this colored pigment by the addition of a solution of an alkali metal carbonate such as sodium carbonate, the reagents being added in such proportions that the pigment, after isolation by filtering and drying, will contain about 7% of basic nickel carbonate. Such a mixed pigment is isolated in a conventional manner by filtering, washing free of soluble salts and drying, and finally, pulverizing to give a dry pigment powder which may then be dispersed in any conventional coating composition vehicle by any of the well known dispersing or grinding techniques commonly practiced in the manufacture of pigmented coating compositions. It is common practice in the preparation of coating compositions to use about 25 parts of such a pigment per 100 parts of film-forming material in the vehicle so that the basic nickel carbonate in such a composition would be about 1.75 parts per 100 parts of the film-forming material.

The preparation and use of the compositions of this invention are shown in detail in the examples which follow. The basic nickel carbonate used in the examples was prepared from nickel chloride and sodium carbonate. 59.4 parts (0.25 mole) of nickel chloride ($NiCl_2 \cdot 6H_2O$) was dissolved in 1000 parts of water. The temperature was adjusted to about 25° C. and the pH adjusted to about 4.0. A solution containing 26.5 parts (0.25 mole) of sodium carbonate in 500 parts of water at 25° C. was added to the nickel chloride solution over a period of about 20 minutes with vigorous agitation which was continued for some time after precipitation was complete. The precipitate was filtered, washed substantially free of water-soluble salts and dried to constant weight at about 60° C. After pulverizing, the resulting light green powder (about 25 parts) was ready to disperse in any desired coating composition vehicle.

Examined under an electron microscope, the powder appeared to be made up of irregularly shaped particles with an average maximum dimension less than 0.1 micron and typically in the range of about 0.05 to 0.1 micron. Examined by X-ray diffraction, the particles failed to show any definite diffraction lines indicating that they are substantially amorphous.

*Example I*

A clear enamel coating composition was prepared from the following ingredients:

| | Parts |
|---|---|
| Basic nickel carbonate | 42 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Manganese naphthenate drier | 0.2 |

This composition was prepared by grinding the pigment in a ball mill with a portion of the resin and with sufficient solvent to give a suitable consistency. After about 48 hours of grinding, the mill was discharged. The balance of ingredients was then incorporated by simple mixing to give a clear varnish substantially free of color and opacity.

After exposure to the outdoors at 45° south exposure for 12 months, a steel panel coated with this clear varnish showed substantially no change in color, gloss or integrity of the film. In contrast, a steel panel coated with the same enamel but in the absence of any basic nickel carbonate pigment showed blistering after about 3 months under the same conditions of exposure and was badly checked at the end of 12 months.

*Example II*

A composition similar to that given in Example I but using 38 parts of nickel carbonate and 4 parts of aluminum flake instead of 42 parts of basic nickel carbonate was prepared in the manner of Example I. This composition gave the appearance of an aluminum enamel and showed the same excellent durability as the composition in Example I. It was far superior to a similar enamel from which the basic nickel carbonate pigment had been omitted.

*Example III*

A yellow enamel composition was prepared in the manner presented in Example I from the following ingredients:

| | Parts |
|---|---|
| Nickel complex of azo dye-p-chlor aniline→dihydroxy quinoline | 7 |
| Basic nickel carbonate | 23 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Manganese naphthenate drier | 0.2 |

This composition was applied to a panel to give a bright greenish yellow enamel coating. After 12 months' exposure, such compositions retained their high gloss and color and the panels were substantially free of any evidence of film disintegration. Omitting the basic nickel carbonate pigment resulted in a film of substantially the same color, but of inferior durability.

*Example IV*

A clear nitrocellulose lacquer was prepared from the following ingredients:

| | Parts |
|---|---|
| Basic nickel carbonate | 4.5 |
| Cellulose nitrate | 15.4 |
| Non-drying alkyd resin (60% solids) | 7.1 |
| Dibutyl phthalate | 2.5 |
| Castor oil | 2.5 |
| Active solvents | 33.0 |
| Alcohols | 17.8 |
| Aromatic hydrocarbons | 18.2 |

After exposure to the elements, a panel coated with this film showed less discoloration and better gloss retention than a similar panel coated with a similar lacquer containing no basic nickel carbonate.

*Example V*

A metallized lacquer, identical in composition to that given in Example IV except that 4.5 parts of basic nickel carbonate was replaced by 4.0 parts of basic nickel carbonate and 0.5 part of aluminum powder, was prepared. The colorless pigment was ground in a ball mill with the resin plasticizer portion of the mixture together with sufficient solvent to provide a suitable working consistency. The remaining ingredients, including the aluminum powder in the form of a paste, were then incorporated by simple agitation to give a homogeneous product.

The resulting metallized lacquer, when applied to a test panel, exhibited excellent durability upon outdoor exposure. However, omission of the basic nickel carbonate provided a lacquer of the same appearance, but of inferior durability.

*Example VI*

A green enamel was prepared from the following ingredients:

| | Parts |
|---|---|
| Polychloro copper phthalocyanine | 7 |
| Basic nickel carbonate | 23 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Cobalt naphthenate drier | 0.2 |

Panels coated with this enamel exhibited very good color retention, excellent gloss retention and were substantially free from blistering or cracking after 12 months' exposure. Omitting the basic nickel carbonate from the composition provided an enamel that exhibited substantially the same color, but with significant fading, poor gloss retention and some blistering and checking after 12 months' exposure.

Example VII

A blue enamel composition was prepared from the following ingredients:

| | Parts |
|---|---|
| Copper phthalocyanine | 12.8 |
| Titanium dioxide pigment | 12.8 |
| Basic nickel carbonate | 43.4 |
| Long oil soya modified alkyd resin (70% solids) | 390 |
| Aliphatic hydrocarbon solvent | 125 |
| Cobalt naphthenate drier | 1.0 |

Panels coated with this enamel showed, after 12 months' exposure, less bronzing, less chalking and less cracking than a panel coated with the similar enamel without basic nickel carbonate.

Examples III, VI and VII are illustrative of the use of basic nickel carbonate to improve the durability of coating compositions containing colored pigments. Based on 100 parts of the film-forming material, Example III contains 4.7 parts of a yellow azo pigment and 15.3 parts of basic nickel carbonate; Example IV contains 4.7 parts of polychloro copper phthalocyanine and 15.3 parts of basic nickel carbonate; and Example VII contains 3.75 parts of copper phthalocyanine, 3.75 parts of titanium dioxide and 12.7 parts of basic nickel carbonate. For most formulations containing a colored pigment a good balance is obtained by using about 3 to 15 parts of colored pigment and about 10–20 parts of nickel carbonate for each 100 parts of film-forming material.

The following examples illustrate the preparation of pigments containing relatively small amounts of basic nickel carbonate which exhibit marked improvements in lightfastness when dispersed in coating compositions.

Example VIII 421.5 parts of an aqueous paste (21.5% solids=90 parts dry) of a red quinacridone pigment (gamma crystal phase) is thoroughly dispersed in 1500 parts of water. 14 parts of nickel chloride ($NiCl_2 \cdot 6H_2O$) is dissolved in 375 parts of water and this solution is added to the slurry of the pigment which is then heated to the boil. While boiling and thoroughly agitating, a solution of 10 parts of sodium carbonate in 135 parts water is added over a period of about 5 minutes. The slurry is boiled for an additional 10 minutes, filtered hot, washed free of alkali and free of soluble salts and dried at about 60° C. to give a brilliant red pigment containing about 7% basic nickel carbonate.

This pigment is dispersed in a coating composition comparable to that of Example I (but using 30 parts of the red pigment in place of the 42 parts of basic nickel carbonate used in Example I) to give a brilliant red enamel. This formulation contains about 20 parts of pigment per 100 parts of vehicle solids, thus making the basic nickel carbonate content 1.4 parts per 100 parts of vehicle solids. The enamel was applied to specially prepared metal panels and exposed for about 12 months to the elements in Florida. It was compared to panels made in exactly the same manner from the red pigment without the basic nickel carbonate. It was found that the treated pigment was substantially free from any color change during this period of exposure, whereas the untreated red pigment showed a perceptible darkening of color during this same period.

Example IX 77 parts of an aqueous paste of quinacridone-quinone (quin(2,3b)acridine,6,7,13,14(5,12)tetrone) containing 22.8 parts of dry color (29.6% solids) is dispersed in 500 parts of water and a solution of 3.4 parts of nickel chloride ($NiCl_2 \cdot 6H_2O$) in 100 parts of water is added thereto. The slurry is then heated to the boil and a solution of 2.24 parts of sodium carbonate in 50 parts of water is added over a period of about 5 minutes. After boiling for an additional 5 minutes, the slurry is filtered, washed free of soluble salts and free of alkali and dried at 60° C. to give a yellow pigment of good lightfastness when dispersed in an enamel vehicle in a manner similar to that shown in Example VIII above. The basic nickel carbonate content was about 1.4 parts per 100 parts of vehicle solids. A corresponding quinacridone-quinone pigment in the absence of the basic nickel carbonate, when dispersed in a similar vehicle, darkens badly on exposure to sunlight for a relatively short time.

Example X 332.5 parts of an aqueous paste of dibromoanthanthrone (Brilliant Orange RK) containing 50 parts of dry color (15.04% solids) is dispersed in 500 parts of water and 15.75 parts of nickel chloride ($NiCl_2 \cdot 6H_2O$) dissolved in 500 parts of water is added to this slurry. It is then heated to the boil and a solution of 11.1 parts of sodium carbonate dissolved in 250 parts of water is added over a period of about 5 minutes and the material is stirred at the boil for an additional 5 minutes or more. It is filtered, washed free of soluble salts and free of alkali and dried at about 75° C. to give a brilliant orange pigment of superior lightfastness when compared to a similar pigment containing no basic nickel carbonate.

Example XI 1156 parts of an aqueous paste (38.9% solids equals 450 parts dry color) of polychloro copper phthalocyanine pigment is dispersed in 7500 parts of water and a solution of 142 parts of nickel chloride ($NiCl_2 \cdot 6H_2O$) in 2500 parts of water is added thereto. After heating to the boil, a solution of 100 parts of sodium carbonate in 1250 parts of water is added over a period of about 10 minutes, the slurry is stirred without cooling for an additional 10 minutes, filtered hot and washed free of soluble salts and free of alkali. After drying at about 75° C., a brilliant green phthalocyanine pigment is obtained. When dispersed in an enamel vehicle in a manner similar to that shown in Example VIII, panels coated therewith show a marked resistance to bronzing on prolonged exposure to the elements in comparison with panels prepared from an enamel of a similar pigment containing no basic nickel carbonate.

In preparing a basic nickel carbonate to be used in this invention, it has been found that when the product is to be used to produce a coating composition having a maximum degree of transparency and a minimum of color, the basic nickel carbonate should analyze about 50–60% nickel carbonate ($NiCO_3$) and about 20–30% nickel hydroxide ($Ni(OH)_2$). Expressed in other terms, the mole ratio of nickel to carbon dioxide in this preferred product should be between 1.5 and 1.7. This composition approximates the formula $2NiCO_3CO_3 \cdot Ni(OH)_2 \cdot XH_2O$. It has also been found that the temperature of the reaction influences the opacity of the resulting pigment with temperatures above about 25° C. tending to cause an increase in opacity. However, when the basic nickel carbonate is precipitated in small amounts in the presence of another pigment, the opacity and color thereof are of relatively little importance and the critical nature of the proportions of ingredients and of the temperature of reaction becomes less significant and may be subordinated to other properties of the pigment which results from using higher amounts of carbonate and reacting at the boil which result in products of improved texture. When this coprecipitation process is used and the amount of nickel compound is below about 10% of the total pigment, it is even possible to obtain significantly improved results in the dry pigment by precipitating with an alkali to give a nickel hydroxide as the treating agent.

When the basic nickel carbonate is incorporated with a colored pigment to impart lightfastness to the latter, the amount of nickel carbonate used is in the range of about 3–10% by weight of the pigment mixture, and an amount of about 7% is usually preferred. Therefore, in conventional coating formulations, for example, those using about 10-40 parts of pigment per 100 parts of film-forming material the minimum amount of basic nickel carbonate would be about 0.3 part per 100 parts of film-forming material. A preferred amount would be about 1.8 parts per 100 parts of film-forming material. This figure is based upon a preferred amount of about 7% of basic nickel carbonate in the colored pigment mixture, and the use of the pigment in a coating composition in amounts of about 25 parts of pigment per 100 parts of film-forming material. If the nickel carbonate is being used as "durable pigment" to enhance the protective life of a coating composition, much larger amounts should be used. For example, in using colored pigments, it is frequently true that as little as 5 parts of the colored pigment per 100 parts of binder will satisfy the color and hiding power requirements. However, it is generally agreed in the art that compositions of optimum durability require at least 10 parts of pigment per 100 parts of binder, usually in the range of 15-35 parts, and rarely exceeding 40 parts except with pigments of high specific gravity. Hence, additional pigmentation is required when the minimum amount of colored pigment is used, and basic nickel carbonate is admirably suited for supplying these additional amounts. Where substantially clear varnishes are required, basic nickel carbonate, in amounts which are within the limits given above, is also useful to give the increased durability resulting from pigmentation, but with a minimum of color and opacity.

The upper limit on the amount of basic nickel carbonate is not at all critical, and the amount used depends upon the degree of pigmentation the formulator desires in his coating compositions. As a general rule, the amount of pigment in a coating composition does not exceed 50 parts per 100 parts of film-forming material, and this amount can be considered a practical upper limit for the pigment of this invention.

The method for dispersing the pigment in the vehicle is not critical. The only requirement is that the method effectively disperse the pigment in the vehicle to such a degree that the final film is free from any appearance of grit. Grinding in a ball mill, grinding on a three-roll ink mill, various forms of plastic milling and the like prove satisfactory.

This invention is not restricted to the film-formers shown in the examples; i.e., short oil modified alkyds designed to be finished by baking, long oil alkyds designed for air-dry finishes and cellulose nitrate lacquers. Equally useful are linseed oil or other oleoresinous varnishes, modified urea formaldehyde resin varnishes, modified phenol formaldehyde resin varnishes, as well as other synthetic resins and cellulose derivatives.

The invention is not meant to be restricted for use with the specific colored pigments shown in the examples. Aluminum flake, yellow azo pigments, pththalocyanine pigments, quinacridones, vat dye pigments, and titanium oxide pigments are merely illustrative of the many commonly used varieties of pigments. Compositions containing basic nickel carbonate in admixture with most pigments of both low and high durability would provide an improvement in durability.

My invention provides inexpensive coating compositions for preparing clear and colored varnishes and lacquers of substantially improved durability. The relatively colorless formulations are useful to protect exposed surfaces. Both the relatively colorless and colored formulations are useful wherever exposure to the elements is contemplated. Thus, the relatively colorless formulations are useful in varnishes for ship decks and the like; the colored formulations for automobile finishes or enamels and the like. The use of basic nickel carbonate in durable, colored finishes also offers a financial advantage since it can replace a substantial part of the more expensive colored durable pigment.

This application is a continuation-in-part of application Ser. No. 681,178, filed August 30, 1957, which is a continuation-in-part of Ser. No. 463,808, filed October 21, 1954, now abandoned.

I claim:

1. A coating composition comprising an organic film-forming material and basic nickel carbonate in a minor amount sufficient to impart durability to the coating composition.

2. A coating composition comprising an organic film-forming material containing 0.3–50 parts per 100 parts by weight of film-forming material of basic nickel carbonate.

3. A coating composition comprising an organic film-forming material and containing about 15 to about 35 parts per 100 parts of film-forming material of basic nickel carbonate.

4. A composition as in claim 1 wherein the basic nickel carbonate has a composition of 50–60% nickel carbonate, 20–30% nickel hydroxide and the balance water.

5. A composition as in claim 1 wherein the molecular ratio of nickel to carbon dioxide in the basic nickel carbonate is between 1.5 and 1.7.

6. A coating composition as in claim 1 wherein the organic film-forming material is an alkyd resin.

7. A coating composition as in claim 1 wherein the organic film-forming material is cellulose nitrate.

8. A coating composition as in claim 1 wherein the organic film-forming material is an oleoresinous varnish.

9. A coating composition comprising an organic film-forming material, and for each 100 parts of said film-forming material, about 3 to 15 parts of colored pigment and about 10 to 20 parts of basic nickel carbonate.

10. A coating composition comprising an organic film-forming material, and for each 100 parts of said film-forming material, 4.7 parts of the nickel complex of the azo dye obtained by coupling diazotized p-chloro aniline with dihydroxy quinoline and 15.3 parts of basic nickel carbonate.

11. A coating composition comprising an organic film-forming material, and for each 100 parts of said film-forming material, 4.7 parts of polychloro copper phthalocyanine and 15.3 parts of basic nickel carbonate.

12. A coating composition comprising an organic film-forming material, and for each 100 parts of said film-forming material, 3.75 parts of copper phthalocyanine, 3.75 parts of titanium dioxide and 12.7 parts of basic nickel carbonate.

13. A light-stable pigment composition comprising a colored pigment selected from the group consisting of quinacridone, quinacridone-quinone, dibromoanthanthrone, and polychloro copper phthalocyanine and 3–10% by weight of a nickel compound selected from the group consisting of basic nickel carbonate and nickel hydroxide.

14. The pigment composition of claim 13 in which the colored pigment is quinacridone and the nickel compound is basic nickel carbonate.

No references cited.